US 8,283,435 B2

Oct. 9, 2012

(12) United States Patent
Whitehouse

(10) Patent No.: US 8,283,435 B2
(45) Date of Patent: Oct. 9, 2012

(54) PHA ADHESIVE COMPOSITIONS

(75) Inventor: Robert S. Whitehouse, Lexington, MA (US)

(73) Assignee: Metabolix, Inc., Cambridge, MA (US)

( * ) Notice: Subject to any disclaimer, the term of this patent is extended or adjusted under 35 U.S.C. 154(b) by 0 days.

(21) Appl. No.: 10/783,958

(22) Filed: Feb. 20, 2004

(65) Prior Publication Data

US 2004/0213941 A1 Oct. 28, 2004

Related U.S. Application Data

(63) Continuation-in-part of application No. 10/783,995, filed on Feb. 20, 2004.

(60) Provisional application No. 60/449,187, filed on Feb. 21, 2003.

(51) Int. Cl.
*C08G 63/02* (2006.01)

(52) U.S. Cl. .......................... 528/272; 528/361; 528/354

(58) Field of Classification Search .................. 525/450; 528/272, 361, 354; 523/124, 125
See application file for complete search history.

(56) References Cited

U.S. PATENT DOCUMENTS

| | | | |
|---|---|---|---|
| 3,563,971 A | 2/1971 | Wood et al. | |
| 4,076,910 A | 2/1978 | Beck | |
| 4,463,113 A | 7/1984 | Nakahara et al. | |
| 4,511,687 A | 4/1985 | Nakashima et al. | |
| 4,536,531 A | 8/1985 | Ogawa et al. | |
| 4,655,768 A * | 4/1987 | Marecki et al. ................ | 424/448 |
| 4,804,691 A | 2/1989 | English et al. | |
| 4,946,930 A | 8/1990 | Takasa et al. | |
| 5,169,889 A | 12/1992 | Kauffman et al. | |
| 5,191,037 A | 3/1993 | Doi | |
| 5,192,612 A | 3/1993 | Otter et al. | |
| 5,252,646 A | 10/1993 | Iovine et al. | |
| 5,312,850 A | 5/1994 | Iovine et al. | |
| 5,342,868 A | 8/1994 | Kimura et al. | |
| 5,382,679 A | 1/1995 | Galzigna et al. | |
| 5,387,623 A | 2/1995 | Ryan et al. | |
| 5,395,919 A | 3/1995 | Lee et al. | |
| 5,502,116 A | 3/1996 | Noda | |
| 5,502,158 A | 3/1996 | Lipinsky et al. | |
| 5,516,565 A | 5/1996 | Matsumoto | |
| 5,536,564 A | 7/1996 | Noda | |
| 5,550,173 A | 8/1996 | Hammond et al. | |
| 5,614,576 A | 3/1997 | Rutherford et al. | |
| 5,646,217 A | 7/1997 | Hammond | |
| 5,656,367 A | 8/1997 | Iovine et al. | |
| 5,658,646 A | 8/1997 | Takano et al. | |
| 5,693,285 A | 12/1997 | Ishii et al. | |
| 5,693,389 A | 12/1997 | Liggat | |
| 5,700,344 A | 12/1997 | Edgington et al. | |
| 5,711,842 A | 1/1998 | Kemmish | |
| 5,753,364 A | 5/1998 | Rutherford et al. | |
| 5,753,724 A | 5/1998 | Edgington et al. | |
| 5,824,693 A | 10/1998 | Goldberg et al. | |
| 5,853,876 A | 12/1998 | Takano et al. | |
| 5,952,405 A | 9/1999 | Schoenberg et al. | |
| 5,973,100 A | 10/1999 | Asrar et al. | |
| RE36,548 E | 2/2000 | Noda | |
| 6,086,997 A | 7/2000 | Patel et al. | |
| 6,111,006 A | 8/2000 | Waddington | |
| 6,174,990 B1 * | 1/2001 | Noda ............................ | 528/361 |
| 6,191,203 B1 | 2/2001 | Asar | |
| 6,197,749 B1 | 3/2001 | Hamuro et al. | |
| 6,221,316 B1 | 4/2001 | Haenggi et al. | |
| 6,228,934 B1 | 5/2001 | Horowitz et al. | |
| 6,228,954 B1 | 5/2001 | Kaplan et al. | |
| 6,290,803 B1 | 9/2001 | Maksymkiw et al. | |
| 6,306,904 B1 | 10/2001 | Gordziel | |
| 6,307,003 B1 | 10/2001 | Grigat et al. | |
| 6,319,352 B1 | 11/2001 | Simmler et al. | |
| 6,365,680 B1 | 4/2002 | Edgington et al. | |
| 6,369,106 B1 | 4/2002 | Atlas et al. | |
| 6,423,250 B1 | 7/2002 | Blount | |
| 6,472,502 B1 | 10/2002 | Jurgens et al. | |
| 6,515,054 B1 | 2/2003 | Matsushita et al. | |
| 6,585,819 B2 | 7/2003 | Zhao | |
| 6,586,404 B1 | 7/2003 | Demopolos | |
| 6,780,911 B2 * | 8/2004 | Zhong et al. .................. | 524/401 |
| 6,808,795 B2 | 10/2004 | Noda et al. | |
| 6,838,037 B2 | 1/2005 | Autran et al. | |
| 7,098,292 B2 | 8/2006 | Zhao et al. | |
| 7,361,701 B2 | 4/2008 | Takahashi et al. | |
| 7,781,539 B2 | 8/2010 | Whitehouse | |
| 8,003,719 B2 | 8/2011 | Padwa | |
| 2002/0068810 A1 | 6/2002 | Whitehouse et al. | |
| 2002/0077269 A1 * | 6/2002 | Whitehouse et al. ......... | 510/475 |
| 2002/0143116 A1 | 10/2002 | Noda et al. | |
| 2002/0143136 A1 * | 10/2002 | Noda et al. .................... | 528/272 |

(Continued)

FOREIGN PATENT DOCUMENTS

DE 43 00 420 7/1994

(Continued)

OTHER PUBLICATIONS

Saito et al., Microbial Synthesis and Properties of Poly(3-hydroxybutyrate-co-4-hydroxybutyrate), Polymer International, 39 (1996) pp. 169-174.*

Avella et al., "Poly(3-hydroxybutyrate)/poly(methyleneoxide) blends: thermal, crystallization and mechanical behaviour", *Polymer*, vol. 38, No. 25, pp. 6135-6143 (1997).

Blümm et al., "Miscibility, crystallization and melting of poly(3-hydroxybutyrate)/poly(L-lactide) blends", *Polymer*, vol. 36, No. 21, pp. 4077-4081 (1995).

Chen et al., "Miscibility and morphology of blends of poly(3-hydroxybutyrate) and poly(vinyl butyral)", *Polymer*, vol. 42, pp. 8407-8414 (2001).

Chiu et al., "Crystallization induced microstructure of crystalline/crystalline poly(vinylidenefluoride)/poly(3-hydroxybutyrate) blends probed by small angle X-ray scattering", *Polymer*, vol. 42, pp. 5749-5754 (2001).

(Continued)

*Primary Examiner* — James J Seidleck
*Assistant Examiner* — Peter A Salamon
(74) *Attorney, Agent, or Firm* — Foley & Lardner LLP

(57) ABSTRACT

PHA adhesive compositions, and related methods and articles are disclosed.

36 Claims, No Drawings

U.S. PATENT DOCUMENTS

| | | | | |
|---|---|---|---|---|
| 2004/0220355 | A1* | 11/2004 | Whitehouse | 525/436 |
| 2006/0247390 | A1* | 11/2006 | Whitehouse et al. | 525/450 |
| 2011/0124779 | A1 | 5/2011 | Whitehouse et al. | |

FOREIGN PATENT DOCUMENTS

| | | |
|---|---|---|
| DE | 4300420 | 7/1994 |
| DE | 44 30 415 | 3/1996 |
| DE | 197 50 371 | 11/1997 |
| DE | 9304018 | 10/1998 |
| EP | 0300480 | 1/1989 |
| EP | 0 450 777 | 10/1991 |
| EP | 0450777 | 10/1991 |
| EP | 0494405 | 7/1992 |
| EP | 0501641 | 9/1992 |
| EP | 0 553 394 | 8/1993 |
| EP | 0572110 | 12/1993 |
| EP | 0 609 713 A1 | 8/1994 |
| EP | 0 741 177 | 11/1996 |
| EP | 0 826 803 | 3/1998 |
| EP | 0826803 | 3/1998 |
| EP | 0 890 614 | 1/1999 |
| EP | 0890614 | 1/1999 |
| EP | 1 193 294 | 4/2002 |
| EP | 1 236 753 | 9/2002 |
| EP | 1593705 A1 | 11/2005 |
| FR | 2656620 | 7/1991 |
| GB | 2 136 003 A | 9/1984 |
| JP | 57030776 | 2/1982 |
| JP | 83046277 | 10/1983 |
| JP | 01-286820 | 11/1989 |
| JP | 05 339 557 | 12/1993 |
| JP | 06-340786 | 12/1994 |
| JP | 11 302521 | 11/1999 |
| JP | 11302521 | 11/1999 |
| JP | 2001-302897 | 10/2001 |
| JP | 2001 316658 | 11/2001 |
| JP | 2001-316658 | 11/2001 |
| JP | 2002-050617 | 2/2002 |
| JP | 2002-532618 | 10/2002 |
| JP | 2003-192884 | 7/2003 |
| JP | 2004-190025 | 7/2004 |
| JP | 2004-190026 | 7/2004 |
| WO | WO 94/10257 | 5/1994 |
| WO | WO-94/28070 | 12/1994 |
| WO | WO 95/02649 | 1/1995 |
| WO | WO 95/10577 | 4/1995 |
| WO | WO 95/20615 | 8/1995 |
| WO | WO 96/05264 | 2/1996 |
| WO | WO 96/08535 | 3/1996 |
| WO | WO 97/04036 | 2/1997 |
| WO | WO 97/07153 | 2/1997 |
| WO | WO 98/29375 | 7/1998 |
| WO | WO 99/23146 | 5/1999 |
| WO | WO-99/46331 | 9/1999 |
| WO | WO-00/37119 | 6/2000 |
| WO | WO 01/15671 A2 | 3/2001 |
| WO | WO 01/80832 | 11/2001 |
| WO | WO 02/10303 | 2/2002 |
| WO | WO 02/17962 | 3/2002 |
| WO | WO 02/28969 | 4/2002 |
| WO | WO 02/50156 | 6/2002 |
| WO | WO 02/005581 A2 | 7/2002 |
| WO | WO 02/005581 A3 | 7/2002 |
| WO | WO 02/059201 | 8/2002 |
| WO | WO 02/077080 | 10/2002 |
| WO | WO 02/085983 | 10/2002 |
| WO | WO 02/090314 | 11/2002 |
| WO | WO 02/094759 | 11/2002 |
| WO | WO 2005/025570 | 3/2005 |

OTHER PUBLICATIONS

Choe et al., "Miscibility of poly(3-hydroxybutyrate-co-3hydroxyvalerate) and poly(vinyl chloride) blends", *Polymer*, vol. 36, No. 26, pp. 4977-4982 (1995).

Chun et al., "Thermal properties of poly(hydroxybutyrate-co-hydroxyvalerate) and poly(ε-caprolactone) blends", *Polymer*, vol. 41, pp. 2305-2308 (2000).

Class et al., "The Viscoelastic Properties of Rubber-Resin Blends. I. The Effect of Resin Structure", *J. Appl. Poly Sci.*, vol. 30, No. 2, pp. 805-814 (1985).

Class et al., "The Viscoelastic Properties of Rubber-Resin Blends. II. The Effect of Resin Molecular Weight", *J. Appl. Poly Sci.*, vol. 30, No. 2, pp. 815-824 (1985).

Class et al., "The Viscoelastic Properties of Rubber-Resin Blends. III. The Effect of Resin Concentration", *J. Appl. Poly Sci.*, vol. 30, No. 2, pp. 825-842 (1985).

Fujita et al., "Miscibility Between Natural Rubber and Tackifiers. I. Phase Diagrams of the Blends of Natural Rubber with Rosin and Terpene Resins", *J. Appl. Poly Sci.*, vol. 64, No. 11, pp. 2191-2197 (1997).

Fujita et al., "Effects of Miscibility on Probe Tack of Natural-Rubber-Based Pressure-Sensitive Adhesives", *J. Appl. Poly Sci.*, vol. 70, No. 4, pp. 771-776 (1998).

Fujita et al., "Effects of Miscibility on Peel Strength of Natural-Rubber-Based Pressure-Sensitive Adhesives", *J. Appl. Poly Sci.*, vol. 70, No. 4, pp. 777-784 (1998).

Goh et al., "A completely miscible ternary blend system of poly(3-hydroxybutyrate), poly(ethylene oxide) and polyepichlorohydrin", *Polymer*, vol. 40, pp. 5733-5735 (1999).

Hay et al., "Crystallisation of poly(3-hydroxybutyrate)/polyvinyl acetate blends", *Polymer*, vol. 41, pp. 5749-5757 (2000).

Hobbs et al., "The effect of water on the crystallization of thin films of poly(hydroxybutyrate)", *Polymer*, vol. 38, No. 15, pp. 3879-3883 (1997).

Iriondo et al., "Thermal and infra-red spectroscopic investigations of a miscible blend composed of poly(vinyl phenol) and poly(hydroxybutyrate)", *Polymer*, vol. 36, No. 16, pp. 3235-3237 (1995).

Iwata, "Role of entanglement in crystalline polymers 1. Basic theory", *Polymer*, vol. 43, pp. 6609-6626 (2002).

Kim et al., "Miscibility and Pee Strength of Acrylic Pressure-Sensitive Adhesives: Acrylic Copolymer-Tackifier Resin Systems", *J. Appl. Poly Sci.*, vol. 56, No. 2, pp. 201-209 (1995).

Luo et al., The effect of molecular weight on the lamellar structure, thermal and mechanical properties of poly(hydroxybutyrate-co-hydroxyvalerates), *Polymer*, vol. 43, pp. 4159-4166 (2002).

Maekawa et al., "Miscibility and tensile properties of poly (β-hydroxybutyrate)-cellulose propionate blends", *Polymer*, vol. 40, pp. 1501-1505 (1999).

McNally et al., "Polyamide-12 layered silicate nanocomposites by melt blending", *Polymer*, vol. 44, pp. 2761-2772 (2003).

Miguel et al., "Blends of bacterial poly(3-hydroxybutyrate) with synthetic poly(3-hydroxybutyrate) and poly(epichlorohydrin): transport properties of carbon dioxide and water vapour", *Polymer*, vol. 42, pp. 953-962 (2001).

Mizumachi et al., "Theory of Tack of Pressure-Sensitive Adhesive. II", *J. Appl. Poly Sci.*, vol. 37, No. 11, pp. 3097-3104 (1989).

Nakajima et al., Rheology, Composition, and Peel-Mechanism of Block Copolymer-Tackifier-Based Pressure Sensitive Adhesives. *J. Appl. Poly Sci.*, vol. 44, No. 8, pp. 1437-1456 (1992).

Ohkoshi et al., "Miscibility and solid-state structures for blends of poly[(S)-lactide] with atactic poly[(R,S)-3-hydroxybutyrate]", *Polymer*, vol. 41, pp. 5985-5992 (2000).

Paul et al., "New nanocomposite materials based on plasticized poly(L-lactide) and organo-modified montmorillonites: thermal and morphological study", *Polymer*, vol. 44, pp. 443-450 (2003).

Qiu et al., "Melting behaviour of poly(butylenes succinate) in miscible blends with poly(ethylene oxide)", *Polymer*, vol. 44, pp. 3095-3099 (2003).

Qiu et al., "Miscibility and crystallization of poly(ethylene oxide) and poly(ε-caprolactone) blends", *Polymer*, vol. 44, pp. 3101-3106 (2003).

Qiu et al., "Poly (hydroxybutyrate)/poly(butylenes succinate) blends: miscibility and nonisothermal crystallization", *Polymer*, vol. 44, pp. 2503-2508 (2003).

Whitehouse R. S. "Contact Adhesives", *Critical Reports on Applied Chemistry, Synthetic Adhesives & Sealants*, Chapter 1, vol. 16, edited by WC Wake (1987).

Willett et al., "Processing and properties of extruded starch/polymer foams", *Polymer*, vol. 43, pp. 5935-5947 (2002).

Xu et al., "In situ FTIR study on melting and crystallization of polyhydroxyalkanoates", *Polymer*, vol. 43, pp. 6893-6899 (2002).

Yoon et al., "Compatibility of poly(3-hydroxybutyrate)/poly(ethylene-co-vinyl acetate) blends", *Polymer*, vol. 39, No. 12, pp. 2479-2487 (1998).

Yoshie et al., Temperature dependence of cocrystallization and phase segregation in blends of poly (3-hydroxybutyrate) and poly(3-hydroxybutyrate-*co*-3-hydroxyvalerate), *Polymer*, vol. 42, pp. 8557-8563 (2001).

Yuan et al., "Miscibility and transesterification of phenoxy with biodegradable poly(3-hydroxybutyrate)", *Polymer*, vol. 39., vol. 10, pp. 1893-1897 (1998).

Zhang et al., "Miscibility, melting and crystallization behavior of two bacterial polyester/poly(epichlorohydrin-*co*-ethylene oxide)blend systems", *Polymer*, vol. 41, pp. 1429-1439 (2000).

Abe et al., "Synthesis and Characterization of Poly[(R,S)-3-hydroxybutyrate-*b*-6-hydroxyhexanoate] as a Compatibilizer for a Biodegradabl Blend of Poly[(R)-3-hydroxybutyrate] and Poly(6-hydroxyhexanoate)", *Macromolecules*, 27(21):6012-6017 (1994).

Iannace et al., "Poly(3-hydroxybutyrate)-*co*-(3-hydroxyyalerate)/Poly-L-Lactide Blends: Thermal and Mechanical Properties", *Journal of Applied Polymer Science*, 54:1525-1535 (1994).

Mallardéet al., "Hydrolytic Degradability of poly(3-hydroxyoctanoate) and of a poly(3-hydroxyoctanoate)/poly(R,S-lactic acid) Blend", *Polymer*, 39(15):3387-3392 (1998).

Scandola et al., "Polymer Blends of Natural Poly(3-hydroxybutyrate-*co*-3-hydroxyvalerate) and a Synthetic Atactic Poly(3-hydroxybutyrate). Characterization and Biodegradation Studies.", *Macromolecules*, 30(9):2568-2574 (1997).

Tsuji et al., "Blends of Crystalline and Amorphous Poly(lactide) III. Hydrolysis of Solution-cast Blend Films", *Journal of Applied Polymer Science*, 64(7):855-863 (1997).

Examiner's Report for Australian Patent Application No. 2004312517 dated Aug. 28, 2009.

Third Office Action for Chinese Patent Application No. 200480042224.3 issued Dec. 4, 2009.

Final Office Action for U.S. Appl. No. 10/783,995 mailed Jan. 26, 2010.

Notice of Allowance issued in U.S. Appl. No. 10/783,995 and mailed on Apr. 14, 2010.

Office Action issued in Japanese Patent Application No. 2006-503726 mailed on May 19, 2010 (English translation provided).

Office Action issued in Japanese Patent Application No. 2006-503727 mailed on May 17, 2010 (English translation provided).

EP Communication for EP Patent Application No. 04713309.5 dated Nov. 24, 2005.

EP Communication for EP Patent Application No. 04713313.7 dated Nov. 29, 2005.

EP Communication for EP Patent Application No. 04713313.7 mailed Jul. 28, 2006.

EP Search Report for EP Patent Application No. 07076074.9 dated May 13, 2008.

EP Search Report for EP Patent Application No. 08009261.2 dated Aug. 4, 2008.

International Preliminary Report on Patentability for PCT/US2004/043660 issued Jul. 3, 2006.

International Preliminary Report on Patentability for PCT/US2004/004991 mailed on Jan. 14, 2005.

International Search Report and Written Opinion for PCT/US2004/004991 mailed Jul. 15, 2004.

International Search Report and Written Opinion for PCT/US2004/004992 mailed Jul. 19, 2004.

International Search Report and Written Opinion for PCT/US2004/043600 mailed Jun. 20, 2005.

International Search Report for PCT/US2004/043660 mailed Dec. 15, 2005.

Notice of Allowance for U.S. Appl. No. 11/022,954 mailed Sep. 25, 2009.

Supplementary European Search Report for EP Patent Application No. 04815630.1 mailed Jan. 22, 2007.

Hideki, A., et al., "Synthesis and Characterization of Poly[R,S)-3-hydroxybutyrate-b-6hydroxyhexanoate] as a Compatibilizer for Biodegradable Blend of Poly[(R)-3-hydroxybutyrate] and Poly(6-hydroxyhexanoate)," *Macromolecules*, vol. 27, No. 21: 6012-6017 (1994).

Kleinman W A et al.: "Status of gluthathione and other thiols and disulfides in human plasma." Biochemical Pharmacology. Jul. 1, 2000, vol. 60, No. 1, Jul. 1, 2000, pp. 19-29.

Nagasawa et al.: "Protection against acetaminophen-induced hepatotoxicity by L-CySSME and its N-acetyl and ethyl ester derivatives." Journal of Biochemical toxicology, 1996, vol. 11, No. 6, pp. 289-295.

Purdie J. W., "Gamma-Radiolysis of Cysteine-Cysteamine Disulfide in Aqueous solution" Canadian J. of Chemistry, vol. 49, 1971, pp. 725-730.

Sato S. et al.: "Indentification of thioether intermediates in the reductive transformation of gonyautoxins into saxitoxins by thiols." Bioorganic & Medicinal Chemistry Letters. Aug. 21, 2000, vol. 10, No. 16, pp. 1787-1789.

European Communication issued in European Patent Application No. 07 076 074.9 and dated Sep. 1, 2011.

Notice of Reasons for Rejection issued in Japanese Patent Application No. 2006-503727 and mailed Sep. 7, 2011.

Office Action issued in Canadian Patent Application No. 2,550,009 and dated Sep. 12, 2011.

EP Communication issued in EP Patent Application No. 07076074.9 and dated Dec. 16, 2010.

Final Notice of Reasons for Rejection issued in Japanese Patent Application No. 2006-503726 and mailed Dec. 16, 2010. (*English translation provided*).

Notice for Reasons for Rejection issued in Japanese Patent Application No. 2006-547458 and mailed on Jan. 24, 2011. (*English translation provided*).

Notice of Allowance issued in U.S. Appl. No. 12/851,213 and mailed on Dec. 22, 2010.

Extended Search Report issued in European Patent Application No. 10007910.2 and dated Feb. 20, 2012.

Notice of Reasons for Rejection issued in Japanese Patent Application No. 2006-547458 and mailed Jan. 24, 2012.

Examiner's Report issued in Canadian Patent Application No. 2,550,009 and dated Jun. 1, 2011.

Notice of Allowance issued in U.S. Appl. No. 13/077,580 and mailed May 19, 2011.

Non-final Office Action issued in U.S. Appl. No. 12/695,411 and mailed on Oct. 21, 2011.

Examination Report issued in European Application No. 08009261.2 and dated Sep. 24, 2010.

Non-final Office Action issued in U.S. Appl. No. 12/851,213 and mailed Sep. 21, 2010.

Office Action issued in JP Patent Application No. 2006-503727 and mailed May 23, 2012 (English translation provided).

Final Office Action issued in U.S. Appl. No. 12/695,411 and mailed Apr. 11, 2012.

\* cited by examiner

PHA ADHESIVE COMPOSITIONS

CROSS REFERENCE TO RELATED APPLICATIONS

This application is a continuation-in-part of U.S. application Ser. No. 10/783,995, entitled "PHA Blends," filed on Feb. 20, 2004, and claims the benefit of U.S. Provisional Application No. 60/449,187, entitled "PHA Adhesive Compositions," filed on Feb. 21, 2003. The contents of both of these applications are hereby incorporated by reference in their entireties.

TECHNICAL FIELD

The invention relates to adhesive compositions that contain at least one polyhydroxyalkanoate (PHA), and related methods and articles.

BACKGROUND

Adhesive compositions can be used to form a bond between two surfaces, such as, for example, surfaces made of wood, metal, plastic, paper, cloth, mammalian skin and/or tissues.

In certain applications, a surface can be coated with a relatively tacky adhesive composition, commonly referred to as a pressure sensitive adhesive. The coated surface can be contacted with a second, uncoated surface using relatively light pressure to form an adhesive bond between the two surfaces.

In some applications, one or both surfaces can be coated with an adhesive that is relatively non-tacky prior to contact with the surface(s), commonly referred to as a contact adhesive. When the surfaces are contacted under appropriate conditions of temperature and/or pressure, an adhesive bond can form between the surfaces.

SUMMARY

The invention relates to PHA adhesive compositions, and related methods and articles.

In one aspect, the invention features an adhesive composition that contains a PHA. The adhesive composition has a surface tack time value of at most about 15 seconds. When exposed to a pressure of at most about 100 psig, the adhesive composition can form a bond with a surface or itself, where the bond has a peel bond strength of at least about 10 $Nm^{-2}$.

In another aspect, the invention features an article that includes a substrate and a composition supported by a surface of the substrate. The composition contains a PHA and has a surface tack time value of at most about 15 seconds. When exposed to a pressure of at most about 100 psig, the composition can form a bond with a surface of another substrate, where the bond has a peel bond strength of at least about 10 $Nm^{-2}$.

In a further aspect, the invention features an article that includes a substrate and a composition supported by a surface of the substrate. The composition contains a PHA. The composition has a surface tack of at most about 15 seconds and an open time of at least about 70 minutes.

In one aspect, the invention features an article that includes a substrate and a composition supported by a surface of the substrate. The composition contains a PHA having a weight average molecular weight of from about 1,000 Daltons to about 900,000 Daltons. When exposed to a pressure of at most about 100 psig, the adhesive composition can form a bond with a surface, where the bond has a peel bond strength of at least about 10 $Nm^{-2}$.

In another aspect, the invention features an article that includes a substrate and a composition supported by a surface of the substrate. The composition contains a PHA having a crystallinity of from about 5% to about 65%. When exposed to a pressure of at most about 100 psig, the adhesive composition can form a bond with a surface, where the bond has a peel bond strength of at least about 10 $Nm^{-2}$.

In a further aspect, the invention features an article that includes a substrate and a composition supported by a surface of the substrate. The composition contains a PHA having a glass transition temperature of from about −40° C. to about 20° C. When exposed to a pressure of at most about 100 psig, the adhesive composition can form a bond with a surface, where the bond has a peel bond strength of at least about 10 $Nm^{-2}$.

In one aspect, the invention features a method that includes contacting a composition with a surface of an article, and processing the composition to form a layer having a surface tack time value of at most about 15 seconds. The composition contains a PHA and a solvent for the PHA. When exposed to a pressure of at most about 100 psig, the layer can form a bond, where the bond has a peel bond strength of at least about 10 $Nm^{-2}$.

Processing the composition can include removing at least some of the solvent from the composition, e.g., removing solvent from the composition at a rate so that an open time of the layer is less than a time period at which the PHA reaches its final crystallinity in the layer. The layer can contain, e.g., at most about 95 weight percent adhesive additives. The layer can contain, e.g., at most about 40 weight percent solvent. The layer can contain, e.g., at least about five weight percent PHA. The peel bond strength of the layer can be at least about 100 $Nm^{-2}$. The pressure can be at most about 50 psig. The layer can have an open time of at least about 70 minutes. The PHA can have a weight average molecular weight of from about 1,000 Daltons to about 900,000 Daltons. The PHA in the layer can have a crystallinity of from about 5% to about 65%. The PHA in the layer has a glass transition temperature of from about −40° C. to about 20° C. The composition can include at least two different PHAs, e.g., one of the PHAs can have a first weight average molecular weight, and a different PHA can have a second weight average molecular weight, a difference between the first and second weight average molecular weights being at least about 1,000 Daltons.

In another aspect, the invention features a method that includes pressing a PHA between at least two surfaces to form a pressed PHA, and separating the surfaces to expose the pressed PHA. The pressed PHA has a surface tack time value of at most about 15 seconds. When exposed to a pressure of at most about 100 psig, the pressed PHA can form a bond with a surface, where the bond has a peel bond strength of at least about 10 $Nm^{-2}$.

Pressing can occur at a temperature of at most about 150° C. Pressing can occur at a pressure of at most about 100 psig. The PHA can have a weight average molecular weight of from about 1,000 Daltons to about 900,000 Daltons. The pressed PHA can have a crystallinity of from about 5% to about 65%. The pressed PHA can have a glass transition temperature of from about −10° C. to about −30° C.

In a further aspect, the invention features an adhesive composition that includes two different PHAs. The difference in the weight average molecular weight of the two PHAs is at least about 1,000 Daltons. When exposed to a pressure of at most about 100 psig, the adhesive composition can form a bond with a surface, where the bond has a peel bond strength of at least about 10 Nm$^{-2}$.

In one aspect, the invention features an article that includes a substrate and an adhesive composition supported by the substrate. The adhesive composition includes two different PHAs. The difference in the weight average molecular weight of the two PHAs is at least about 1,000 Daltons. When exposed to a pressure of at most about 100 psig, the adhesive composition can form a bond with a surface, where the bond has a peel bond strength of at least about 10 Nm$^{-2}$.

In another aspect, the invention features an adhesive composition that includes two different PHAs. At least one of the PHAs has a polydispersity index of at least about two. When exposed to a pressure of at most about 100 psig, the adhesive composition can form a bond with a surface, where the bond has a peel bond strength of at least about 10 Nm$^{-2}$.

In a further aspect, the invention features an article that includes a substrate and an adhesive composition supported by the substrate. The adhesive composition includes two different PHAs. At least one of the PHAs has a polydispersity index of at least about two. When exposed to a pressure of at most about 100 psig, the adhesive composition can form a bond with a surface, where the bond has a peel bond strength of at least about 10 Nm$^{-2}$.

Embodiments can include one or more of the following features.

The PHA can have a weight average molecular weight of, for example, from about 1,000 Daltons to about 900,000 Daltons.

The PHA can have a glass transition temperature of from, for example, about −40° C. to about 20° C.

The PHA can have a crystallinity of, for example, from about 5% to about 65%.

The PHA can have a polydispersity index of, for example, at least about 2, at least about 2.5.

The composition can have a surface tack time value of, for example, at most about 15 seconds.

The composition can have an open time of, for example, at least about 10 minutes.

The composition can further include one or more solvents.

The composition can contain one or more adhesive additives (e.g., one or more tackifiers, cross-linking agents, initiators, colorants, waxes, stabilizers and/or plasticizers).

The composition can contain at least two different PHAs. The difference in the weight average molecular weight of two of the PHAs can be, for example, at least about 1,000 Daltons, at least about 50,000 Daltons, at least about 100,000 Daltons.

The pressure can be, for example, at most about 50 psig.

The peel bond strength can be, for example, at least about 100 Nm$^{-2}$.

Other features, objects, and advantages of the invention will be apparent from the description and the claims.

DETAILED DESCRIPTION

In general, the PHA adhesive compositions contain one or more PHAs, and optionally one or more additional components (e.g., one or more solvents, one or more adhesive additives).

In certain embodiments, a PHA adhesive composition can have a relatively low surface tack. For example, in some embodiments, a PHA adhesive composition can be substantially non-tacky to the touch prior to its use in forming an adhesive bond between two surfaces. In certain embodiments, a PHA adhesive composition can have a surface tack time value of at most about 15 seconds (e.g., at most about 12 seconds, at most about 10 seconds, at most about 9 seconds, at most about 8 seconds, at most about 7 seconds, at most about 6 seconds, at most about 5 seconds, at most about 4 seconds, at most about 3 seconds, at most about 2 seconds, at most about 1 second, at most 0.5 second, at most 0.1 second, zero seconds) prior to its use in forming an adhesive bond between two surfaces.

As referred to herein, the surface tack time value of a PHA adhesive composition is determined as follows. A galvanised steel washer having mass of 13.85 grams (g) with external diameter 38.17 millimeter (mm) and internal diameter 13.41 millimeter (mm) is placed onto a horizontally displaced surface that is coated with the PHA adhesive composition. The surface is then inverted, so that gravitational force on the object and the adhesive force of the composition on the object oppose each another. The time required for the object to fall from the surface is the surface tack time value of the PHA composition. In general, a PHA adhesive composition having a lower surface tack will have a shorter surface tack time value than a PHA adhesive composition having a higher surface tack.

In some embodiments, a PHA composition can form a relatively strong bond between two surface when exposed to a relatively low laminating pressure. For example, in certain embodiments, a PHA adhesive composition can form an adhesive bond between two surfaces with a peel bond strength of at least about 10 Newtons per square meter (N/m$^2$) (e.g., at least about 50 N/m$^2$, at least about 100 N/m$^2$, at least about 250 N/m$^2$, at least about 500 N/m$^2$, at least about 1000 N/m$^2$) when the PHA composition is exposed to a laminating pressure of at most about 100 pounds per square inch gauge (psig) (e.g., at most about 90 psig, at most about 80 psig, at most about 70 psig, at most about 60 psig, at most about 50 psig, at most about 40 psig, at most about 30 psig, at most about 20 psig, at most about 15 psig, at most about 10 psig, at most about 5 psig, at most about 1 psig).

As used herein, a laminating pressure refers to a pressure applied to the composition when it is in contact with both surfaces.

As referred to herein, the peel bond strength of a bond between the two surfaces is determined according to the ASTM 1995-92 test method by placing the bonded surfaces in an Instron tensile testing machine and evaluating the force required to separate the surfaces using a 90 degree peel angle and a crosshead speed of 25 millimeter/minute.

In some embodiments, a PHA composition can have a relatively long open time. For example, in certain embodiments, a PHA adhesive composition can have an open time of at least about 10 minutes (e.g., at least about 50 minutes, at least about 70 minutes at least about 100 minutes, at least about 200 minutes, at least about three hours, at least about six hours, at least about 12 hours, at least about 24 hours, at least about 48 hours, at least about 96 hours, at least about 120 hours). As used herein, the open time of a PHA composition refers to the maximum amount of time that the PHA adhesive composition can be exposed to ambient environmental conditions (e.g., ambient temperature, pressure, humidity) prior to its use in forming an adhesive bond. In some embodiments, the open time is generally an upper limit of permissible exposure and/or storage time of a PHA composition before the PHA composition is rendered a non-adhesive composition. In certain embodiments, the open time is exceeded when the PHA adhesive composition is unable to form an adhesive bond between two surfaces with a peel bond strength of at least about 10 N/m$^2$ when the compositions are exposed to a laminating pressure of at most about 100 psig.

A PHA has at least one monomer unit with the structure:

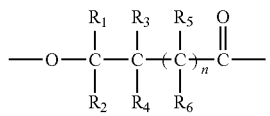

where n is zero or an integer (e.g., one, two, three, four, five, six, seven, eight, nine, 10, 11, 12, 13, 14, 15, etc.). Each of $R_1$, $R_2$, $R_3$, $R_4$, $R_5$ and $R_6$ is independently a hydrogen atom, a halogen atom or a hydrocarbon radical. A hydrocarbon radical contains at least one carbon atom (e.g., one carbon atom, two carbon atoms, three carbon atoms, four carbon atoms, five carbon atoms, six carbon atoms, seven carbon atoms, eight carbon atoms, etc.). A hydrocarbon radical can be saturated or unsaturated, substituted or unsubstituted, branched or straight chained, and/or cyclic or acyclic. Examples of substituted hydrocarbon radicals include halo-substituted hydrocarbon radicals, hydroxy-substituted hydrocarbon radicals, nitrogen-substituted hydrocarbon radicals and oxygen-substituted hydrocarbon radicals. Examples of hydrocarbon radicals include methyl, ethyl, propyl, butyl, pentyl, hexyl, octyl and decyl.

Examples of monomer units include 3-hydroxybutyrate, 3-hydroxypropionate, 3-hydroxyvalerate, 3-hydroxyhexanoate, 3-hydroxyheptanoate, 3-hydroxyoctanoate, 3-hydroxynonaoate, 3-hydroxydecanoate, 3-hydroxydodecanoate, 3-hydroxytetradecanoate, 3-hydroxyhexadecanoate, 3-hydroxyoctadecanoate, 3-hydroxy-4-pentenoate, 4-hydroxybutyrate, 4-hydroxyvalerate, 5-hydroxyvalerate, and 6-hydroxyhexanoate.

In some embodiments, the PHA can be a homopolymer (all monomer units are the same). Examples of PHA homopolymers include poly 3-hydroxyalkanoates (e.g., poly 3-hydroxypropionate, poly 3-hydroxybutyrate, poly 3-hydroxyhexanoate, poly 3-hydroxyheptanoate, poly 3-hydroxyoctanoate, poly 3-hydroxydecanoate, poly 3-hydroxydodecanoate), poly 4-hydroxyalkanoates (e.g., poly 4-hydroxybutyrate), poly 5-hydroxyalkanoates (e.g., poly 5-hydroxypentanoate), poly 6-hydroxyalkanoates (e.g., poly 6-hydroxyhexanoate) and polylactic acid. Another example of a homopolymer of interest is polyglycolic acid (for which there is only one carbon other than the carbonyl carbon in the monomer structure).

In certain embodiments, the PHA can be a copolymer (contain two or more different monomer units). Examples of PHA copolymers include poly 3-hydroxybutyrate-co-3-hydroxypropionate, poly 3-hydroxybutyrate-co-4-hydroxybutyrate, poly 3-hydroxybutyrate-co-4-hydroxypentenoate, poly 3-hydroxybutyrate-co-3-hydroxyvalerate, poly 3-hydroxybutyrate-co-3-hydroxyhexanoate, poly 3-hydroxybutyrate-co-4-hydroxybutyrate, poly 3-hydroxybutyrate-co-4-hydroxyvalerate, poly 3-hydroxybutyrate-co-6-hydroxyhexanoate, poly 3-hydroxybutyrate-co-3-hydroxyheptanoate, poly 3-hydroxybutyrate-co-3-hydroxyoctanoate, poly 3-hydroxybutyrate-co-3-hydroxydecanoate, poly 3-hydroxybutyrate-co-3-hydroxydodecanotate, poly 3-hydroxybutyrate-co-3-hydroxyoctanoate-co-3-hydroxydecanoate, poly 3-hydroxydecanoate-co-3-hydroxyoctanoate, and poly 3-hydroxybutyrate-co-3-hydroxyoctadecanoate. Although examples of PHA copolymers having two different monomer units have been provided, the PHA can have more than two different monomer units (e.g., three different monomer units, four different monomer units, five different monomer units, six different monomer units, seven different monomer units, eight different monomer units, nine different monomer units, etc.).

In certain embodiments, the PHA can be derived from biomass, such as plant biomass and/or microbial biomass (e.g., bacterial biomass, yeast biomass, fungal biomass). Biomass-derived PHA can be formed, for example, via enzymatic polymerization of the monomer units. The biomass can be formed of one or more of a variety of entities. Such entities include, for example, microbial strains for producing PHAs (e.g., *Alcaligenes eutrophus* (renamed as *Ralstonia eutropha*), *Bacillus, Alcaligenes latus, Azotobacter, Aeromonas, Comamonas, Pseudomonads*), genetically engineered organisms, preferably containing no recombinant plasmids, for producing PHAs (e.g., *Pseudomonas, Ralstonia, Escherichia coli, Klebsiella*), yeasts for producing PHAs, and plant systems for producing PHAs. Such entities are disclosed, for example, in Lee, *Biotechnology & Bioengineering* 49: 1-14 (1996); Braunegg et al., (1998), J. Biotechnology 65: 127-161; Madison, L. L. and Huisman, G. W. (1999), Metabolic Engineering of Poly(3-Hydroxyalkanoates): From DNA to Plastic. Microbiol. Mol. Biol. Rev. 63, 21-53; and Snell and Peoples 2002, Metabolic Engineering 4: 29-40, which are hereby incorporated by reference.

In certain embodiments, the PHA can be derived by chemical synthesis, such as by the ring opening polymerization of β-lactone monomers using various catalysts or initiators such as aluminoxanes, distannoxanes, or alkoxy-zinc and alkoxy-aluminum compounds (see Agostini, D. E. et al. *Polym. Sci.*, Part A-1, 9: 2775-2787 (1971); Gross, R. A. et al., *Macromolecules* 21:2657-2668 (1988); Dubois, P. I. et al., *Macromolecules*, 26:4407-4412 (1993); LeBorgne, A. and Spassky, N. *Polymer*, 30:2312-2319 (1989); Tanahashi, N. and Doi, Y. *Macromolecules*, 24:5732-5733 (1991); Hori, Y. M. et al., *Macromolecules*, 26:4388-4390 (1993); Kemnitzer, J. E. et al., *Macromolecules*, 26:1221-1229 (1993); Hori, Y. M. et al., *Macromolecules*, 26:5533-5534 (1993); Hocking, P. J. and Marchessault, R. H., *Polym Bull.*, 30: 163-170 (1993). The PHA can also be obtained by condensation polymerization of esters (see Hubbs, J. C. and Harrison, M. N. U.S. Pat. No. 5,563,239) or by chemoenzymatic methods (see Xie, et al., *Macromolecules*, 30:6997-6998 (1997)).

The PHA can have a weight average molecular weight of from about 1,000 Daltons to about 900,000 Daltons (e.g., from about 10,000 Daltons to about 500,000 Daltons, from about 50,000 Daltons to about 250,000 Daltons, from about 75,000 Daltons to about 150,000 Daltons, from about 95,000 Daltons to about 115,000 Daltons). As used herein, weight average molecular weight is determined by gel permeation chromatography, using e.g., chloroform as both the eluent and diluent for the PHA samples. Calibration curves for determining molecular weights can be generated using polystyrene molecular weight standards.

In some embodiments, a relatively low molecular weight PHA can be obtained as follows. A PHA of a weight average molecular weight of at least about 80,000 Daltons (e.g., at least about 100,000 Daltons, at least about 150,000 Daltons, at least about 200,000 Daltons, at least about 300,000 Daltons, prepared, at least about 400,000 Daltons, at least about 500,000 Daltons, at least about 600,000 Daltons, at least about 700,000 Daltons, at least about 800,000 Daltons, at least about 900,000 Daltons, at least about 1,000,000 Daltons, at least about 1,500,000 Daltons, at least about 2,000,000 Daltons) is prepared (e.g., by one of the methods described above). The PHA is then be subjected to an acid hydrolysis reaction during which the hydrolytic cleavage of one or more monomer units from the PHA can occur. The loss of one or more monomer units can result in the production of a lower molecular weight PHA (a PHA with fewer monomer units than the PHA introduced at the beginning of the hydrolysis reaction). The acid hydrolysis reaction can occur in the presence of a strong acid catalyst, e.g. sulfuric or hydrochloric acid. The reaction can be performed at ambient temperature or elevated temperatures of at least about 70° C. (e.g., at least about 80° C., at least about 90° C., at least about 100° C., at least about 110° C., at least about 120° C., at least about 130° C., at least about 140° C.). The reaction can optionally be carried out in the presence of alcohols, diols or polyols, whereby a lower molecular weight PHA can be obtained in which the terminal carboxyl group of the PHA can be esterifed. PHA hydrolysis reactions are described in commonly owned, copending U.S. patent application Ser. No. 09/999, 782 (Publication Date: Jun. 6, 2002; Publication No.: US 2002/0068810 A1), which is hereby incorporated by reference.

In some embodiments, a PHA can have a polydispersity index (PDI) of at least about 2.0 (e.g., at least about 2.1, at least about 2.2, at least about 2.3, at least about 2.4, at least about 2.5, at least about 2.6, at least about 2.7, at least about 2.8, at least about 2.9). As referred to herein, the PDI of a PHA is calculated by dividing the weight average molecular weight of the PHA by the number average molecular weight of the PHA. The number average molecular weight of a PHA can be measured using gel permeation chromatography.

A PHA can have a glass transition temperature (Tg) of, for example, from about −40° C. to about 20° C. (e.g., from about −35° C. to about 0° C., from about −30° C. to about −5° C., from about −25° C. to about −10° C.). As referred to herein, the Tg of a PHA is determined using differential scanning calorimetry (DSC) as follows. The sample is heated in a differential scanning calorimeter from e.g., −50° C. to +100° C. at 10° C./minute. The glass transition temperature is the inflection in the DSC heat capacity versus temperature curve.

A PHA can have a volume percent crystallinity of from about 5% to about 65% (e.g., from about 20% to about 60%, from about 30% to about 55%, from about 40% to about 50%). As referred to herein, the volume crystallinity of a PHA is determined from the data contained in the DSC heat capacity versus temperature curve and is calculated by dividing the crystalline mass of the PHA sample by the total mass of the PHA sample.

A PHA adhesive composition can contain multiple different PHAs. In some embodiments, the composition can contain different PHAs (e.g., two different PHAs, three different PHAs, four different PHAs, five different PHAs) with a difference in the weight average molecular weight of two of the PHAs being at least 1,000 Daltons (e.g., at least 25,000 Daltons, at least 50,000 Daltons, at least 75,000 Daltons, at least 100,000 Daltons).

In some embodiments, a PHA adhesive composition can contain different PHAs (e.g., two different PHAs, three different PHAs, four different PHAs, five different PHAs) with a difference in the PDI of two of the PHAs being at least 0.05 (e.g., at least 0.10, at least 0.15, at least 0.20, at least 0.25, at least 0.30, at least 0.35, at least 0.40, at least 0.45, at least 0.50).

In certain embodiments, a PHA adhesive composition can contain one or more components in addition to the PHA. For example, in some embodiments, a PHA composition can contain at most about 95 weight percent (e.g., at most about 90 weight percent, at most about 80 weight percent, at most about 70 weight percent, at most about 60 weight percent, at most about 50 weight percent, at most about 40 weight percent, at most about 30 weight percent, at most about 20 weight percent, at most about 10 weight percent, at most about five weight percent, at most about two weight percent) of one or more additional components and/or at least about 5 weight percent PHA (e.g., at least about 10 weight percent PHA, at least about 20 weight percent PHA, at least about 30 weight percent PHA, at least about 40 weight percent PHA, at least about 50 weight percent PHA, at least about 60 weight percent PHA, at least about 70 weight percent PHA, at least about 80 weight percent PHA, at least about 90 weight percent PHA, at least about 95 weight percent PHA, at least about 98 weight percent PHA).

In some embodiments, a PHA composition can contain one or more solvents. For example, in certain embodiments, a PHA adhesive composition can contain at most about 90 weight percent solvent (e.g., at most about 80 weight percent solvent, at most about 75 weight percent solvent, at most about 70 weight percent solvent, at most about 65 weight percent solvent, at most about 60 weight percent solvent, at most about 55 weight percent solvent, at most about 50 weight percent solvent, at most about 45 weight percent solvent, at most about 40 weight percent solvent, at most about 35 weight percent solvent, at most about 30 weight percent solvent, at most about 25 weight percent solvent, at most about 20 weight percent solvent, at most about 15 weight percent solvent, at most about 10 weight percent solvent, at most about five weight percent solvent, at most about two weight percent solvent, at most about one weight percent solvent).

In general, a solvent can be selected as desired. Examples of solvents include water and organic solvents. Examples of organic solvents include hexane, heptane, benzene, toluene, ether, methyl tert-butyl ether (MTBE), ethyl acetate, butyl acetate, methylene chloride, chloroform, acetonitrile, methanol, ethanol, isopropanol, and 2,2,2-trifluoroethanol.

In certain embodiments, the solvent can be a mixed solvent system comprising two or more solvents. Such solvent systems include homogeneous mixed aqueous solvent mixtures (e.g., acetonitrile/water), homogeneous mixed organic solvent mixtures (MTBE/butylacetate), heterogeneous mixed organic solvent mixtures (e.g., heptane/acetonitrile) or heterogeneous mixed organic solvent/water mixtures (e.g., coalescing solvents, e.g. toluene/water).

In certain embodiments, a PHA adhesive composition can contain one or more adhesive additives. For example, in some embodiments, a PHA adhesive composition can contain at most about 95 weight percent adhesive additive (e.g., at most about 90 weight percent adhesive additive, at most about 85 weight percent adhesive additive, at most about 80 weight percent adhesive additive, at most about 75 weight percent adhesive additive, at most about 70 weight percent adhesive additive, at most about 65 weight percent adhesive additive, at most about 60 weight percent adhesive additive, at most about 55 weight percent adhesive additive, at most about 50 weight percent adhesive additive, at most about 45 weight percent adhesive additive, at most about 40 weight percent adhesive additive, at most about 35 weight percent adhesive additive, at most about 30 weight percent adhesive additive, at most about 25 weight percent adhesive additive, at most about 20 weight percent adhesive additive, at most about 15 weight percent adhesive additive, at most about 10 weight percent adhesive additive, at most about 5 weight percent adhesive additive, at most about 1 weight percent adhesive additive, at most 0.5 weight percent adhesive additive) with the remainder being one or more PHAs and optionally one or more solvents.

Examples of adhesive additives include tackifiers (e.g., hydrocarbon tackifying resins). Hydrocarbon tackifying resins are commercially available, for example, as a terpene-type resin, (tradename ZONOREX, Arizona Chemical Company) or a phenolic modified terpene resin (tradename PICOTEX, Hercules Corporation).

In certain embodiments, a PHA adhesive composition can be cross-linked to improve internal strength of the adhesive compositions. In some embodiments, a PHA composition can contain a cross-linking agent, and optionally a thermal or photochemical initiator (e.g., benzoyl peroxide, benzophenone).

In certain embodiments, a PHA adhesive composition can contain a wax (e.g., 12-hydroxystearamide), a stabilizer (e.g., 1,3,5-trimethyl-2,4,6-tris-(3,5-di-tert-butyl-4-hydroxy-benzyl) benzene), a plasticizer (e.g. a phthalate), and/or a colorant (e.g., titanium dioxide).

In certain embodiments, a PHA adhesive composition can be prepared by dissolving a PHA in a solvent to form a solution that contains at most about 50 weight percent PHA (e.g., at most about 45 weight percent PHA, at most about 40 weight percent PHA, at most about 35 weight percent PHA, at most about 30 weight percent PHA, at most about 25 weight percent PHA, at most about 20 weight percent PHA, at most about 15 weight percent PHA, at most about 14 weight percent PHA, at most about 13 weight percent PHA, at most about 12 weight percent PHA, at most about 11 weight percent PHA, at most about 10 weight percent PHA, at most about 9 weight percent PHA, at most about 8 weight percent PHA, at most about 7 weight percent PHA, at most about 6 weight percent PHA, at most about 5 weight percent PHA, at most about 2.5 weight percent PHA, at most about 1 weight percent PHA). The solvent can be a single or mixed solvent.

The PHA solution can be applied to a substrate surface (e.g., by machine or by hand) to form a layer (e.g., a substantially uniform layer) of the PHA solution on the substrate surface. In some embodiments, the layer can have a thickness of at most about 300 microns (μ) (e.g., at most about 275μ, at most about 250μ, at most about 225μ, at most about 200μ, at most about 175μ, at most about 150μ).

Some or all of the solvent can then be removed to leave behind a layer of a PHA adhesive composition on the substrate surface. In certain embodiments, solvent removal can be carried out by natural evaporation (e.g., under ambient conditions with substantially no deliberate displacement of solvent vapors from the vicinity of the substrate or forced evaporation). In some embodiments, solvent removal can be carried out by deliberate displacement of solvent vapors from the vicinity of the substrate (e.g., by a directed stream of air or an inert gas, such as nitrogen or argon). Solvent removal can be carried out, for example, at a temperature of at most about 40° C. (e.g., at most about 35° C., at most about 30° C., at most about 25° C., at most about 20° C., at most about 15° C.).

The extent of solvent removal can be monitored by gravimetric methods (e.g. drying of the substrate surface until a constant weight of the substrate surface is achieved) or spectroscopic techniques (e.g., removing a sample of the adhesive composition from the substrate surface and obtaining a $^1$H NMR spectrum of the sample to detect the solvent). In some embodiments, the substrate surface containing the layer of the PHA adhesive composition can be used for forming an adhesive bond with a second substrate surface when the PHA adhesive composition contains at most about 10 weight percent (e.g., at most about 9 weight percent, at most about 8 weight percent, at most about 7 weight percent, at most about 6 weight percent, at most about 5 weight percent, at most about 4 weight percent, at most about 3 weight percent, at most about 2 weight percent, at most about 1 weight percent, at most 0.5 weight percent, at most 0.1 weight percent) solvent.

In certain embodiments, a PHA adhesive composition can be formed by placing a PHA between two substrate surfaces and pressing the surfaces with a pressure (e.g., at most about 10 psig, at most about 5 psig, at most about 1 psig) at a desired temperature (e.g., at most about 130° C. (e.g., at most about 120° C., at most about 110° C., at most about 100° C., at most about 90° C., at most about 80° C.) for a period of time (e.g., at most about 30 seconds, at most about 20 seconds, at most about 15 seconds, at most about 10 seconds, at most about 5 seconds, at most about 1 second). For example, a household iron can be used during this process. The pressed substrate surfaces can then be cooled (e.g., to at most about 20° C., at most about 15° C., at most about 10° C.) for a period of time (e.g., at least about 5 minutes, at least about 10 minutes, at least about 15 minutes). The substrate surfaces can then be separated and stored at a desired temperature (e.g., at least about 20° C., at least about 23° C., at least about 25° C., at least about 27° C.) for a period of time (e.g., at least about 60 minutes, at least about 70 minutes, at least about 80 minutes, at least about 90 minutes, at least about 100 minutes).

In certain embodiments, when two surfaces are to be adhered to one another, one substrate surface can be coated with the adhesive composition and the second surface can be uncoated. In other embodiments, both surfaces can be coated with the adhesive composition.

In certain embodiments, lamination can be carried out by applying pressure over the area of the contacted substrate surfaces, wherein the surfaces are disposed on a horizontal platform. The laminating pressure can be applied with, for example, the palm of a human hand, a hand-operated roller, or mechanical press.

Each substrate surface can represent a top, side, bottom, etc. of any article. In certain embodiments, the substrate surface can be an overlaying surface which is secured to the top, side, bottom, etc. of any article (e.g., a plastic film lining a cardboard box interior or exterior). In some embodiments, the two substrate surfaces to be laminated can be located on the same article e.g., two overlapping flaps used to seal the contents of a box or similar container. In other embodiments, the two substrate surfaces to be laminated can be located on two separate articles.

The substrate surfaces can be composed of materials, which can include, for example, Mylar, paper, coated paper, poly(tetrafluoroethylene) (PTFE), poly(ethylene terephthalate) (PET), PHA films, fibers, non-wovens or other articles, polylactic acid films, non wovens, food trays or containers, synthetic biodegradable polyesters films or articles, cellophane, or aluminum foil. In certain embodiments, the two substrate surfaces to be laminated can be made of the same material. In other embodiments, the two substrate surfaces can be made of different materials.

The follow examples are illustrative, and not be construed as limiting.

EXAMPLE 1

Determination of Surface Tack Time Value

A galvanised steel washer having mass of 13.85 g with external diameter 38.17 mm and internal diameter 13.41 mm was solvent cleaned to remove surface grease using acetone and allowed to dry. The steel washer was lightly placed onto a horizontal PHA surface conditioned at 20-25 C and allowed to remain on the surface for a period of 60 seconds, after which the PHA surface was inverted and time for the washer to debond measured.

EXAMPLE 2

Preparation of PHA Adhesive Composition Solutions

A one liter glass beaker is equipped with an overhead stirrer and is charged with 450 g of butyl acetate and then 50 g of poly(R-3-hydroxybutyrate co 33.5% 4-hydroxybutyrate) (Mw=110,000) is added portionwise with vigorous stirring at 25° C. Stirring is continued until all of the PHA is observed to dissolve.

EXAMPLE 3

Poly R-3-hydroxybutyrate co 8% R-3-hydroxyvalerate (PHA1) having a glass transition temperature of +2 C as measured by DSC (heating rate 10 C/minute) and DSC crystallinity of approximately 54% was dissolved in dichloromethane and cast onto a Mylar polyester film and the solvent removed by forced evaporation. After 60 minutes two PHA1 films were laminated together under a pressure of 100 psi for 10 seconds. No adhesion between the two films was observed, even when the laminating temperature was increase to 60 C.

Surface tack time value of PHA1 was zero seconds. The test was repeated with an additional 50 g placed on the washer during the initial contact period, surface tack time value was still zero seconds.

EXAMPLES 4-7

Poly R-3-hydroxybutyrate co 8% R-3-hydroxyvalerate (PHA1) was dissolved in dichloromethane. To portions of this solution were added 50 phr (parts per hundred PHA) and 100 phr Foral 85 (Hercules Powder Co) a glycerol ester of hydrogenated wood rosin and Foral 105 (Hercules Powder Co) a pentareythritol ester of hydrogenated wood rosin. Films were cast onto Mylar polyester films and the solvent removed by forced evaporation. These were designated examples 4, 5, 6 and 7 respectively. After 60 minutes two films were laminated together under a pressure of 100 psi for 10 seconds at 25 C: negligible adhesion was observed for any of these compositions.

Surface tack time value of PHA1 was zero seconds. The test was repeated with an additional 50 g placed on the washer during the initial contact period, surface tack time value was still zero seconds.

EXAMPLES 8-9

Tone 85 a polycaprolactone polymer from Union Carbide having a glass transition temperature of −60 C (PHA2) and DSC crystallinity of 50% was dissolved in dichloromethane. To portions of this solution was added 0 phr and 50 phr Foral 105 (Hercules Powder Co) a pentareythritol ester of hydrogenated wood rosin. Films were cast onto Mylar polyester films and the solvent removed by forced evaporation. These were designated examples 8 and 9 respectively. After 60 minutes two films were laminated together under a pressure of 50 psi for 10 seconds at 25 C: negligible adhesion was observed for any of these compositions.

Surface tack time value of PHA2 was zero seconds. The test was repeated with an additional 50 g placed on the washer during the initial contact period, surface tack time value was still zero seconds.

EXAMPLE 10

Poly R-3-hydroxyoctanoate (PHA3) having a glass transition temperature of −35 C as measured by DSC and DSC crystallinity of 15% was dissolved in dichloromethane and cast onto a Mylar polyester film and the solvent removed by forced evaporation, the films had no surface finger tack. After 60 minutes two PHA3 films were laminated together under a pressure of 100 psi for 10 seconds, a moderately strong bond was formed. Even after allowing the film to dry for 2 hours prior to lamination, an acceptable bond could be formed.

Surface tack time value of PHA3 was 2.5 seconds.

EXAMPLE 11

Poly R-3-hydroxyoctanoate (PHA4) emulsion having a glass transition temperature of −35 C as was cast onto paper and the water removed by forced evaporation, the films had no surface finger tack. After 2 hours two PHA4 films were laminated together under a pressure of 100 psi for 10 seconds, a strong bond was formed with paper failure occuring.

Surface tack time value of PHA4 was 1.5 seconds.

EXAMPLE 12

Films of poly R-3-hydroxyoctanoate (PHA5) were obtained by pressing the polymer between two PTFE sheets at 90 C for 5 seconds, followed by cooling at 15 C for 10 minutes, the films had no surface finger tack. The PHA5 films were stored at 25 C for a further 60 minutes prior to being laminated together under a pressure of 10 psi for 10 seconds. The film could not be separated.

Surface tack time value of PHA5 was 1.7 seconds.

EXAMPLE 13

Films of poly R 3-hydroxybutyrate co 20% 4-hydroxybutyrate (PHA6) having a glass transition temperature as measured by DSC of −14 C and DSC crystallinity of 36% were obtained by pressing the polymer between two PTFE sheets at 120 C for 5 seconds, followed by cooling at 15 C for 10 minutes, the films had no surface finger tack. The PHA6 films were stored at 25 C for a further 60 minutes prior to being laminated together under a pressure of 50 psi for 10 seconds. The film could not be separated.

Surface tack time value of PHA6 was 2 seconds.

EXAMPLE 14

Films of poly R 3-hydroxybutyrate co 35% 4-hydroxybutyrate (PHA7) having a glass transition temperature as measured by DSC of −26 C and DSC crystallinity of 15% were obtained by pressing the polymer between two PTFE sheets at 100 C for 5 seconds, followed by cooling at 15 C for 10 minutes The films had very slight finger tack initially but this disappeared over the next 15 minutes. The PHA7 films were stored at 25 C for a further 60 minutes prior to being laminated together under light hand pressure for 10 seconds. The film could not be separated.

Surface tack time value of PHA7 was 1 second.

EXAMPLE 15

Poly R-3-hydroxybutyrate co 35% 4-hydroxybutyrate (PHA8) having a glass transition temperature as measured by DSC of −26 C was dissolved in ethyl acetate and cast onto a Mylar polyester film and the solvent removed by forced evaporation. After 60 minutes two PHA8 films were laminated together under a pressure of 50 psi for 10 seconds, the films could not be separated.

Surface tack time value of PHA8 was 3.5 seconds.

EXAMPLE 16

Films of poly R-3-hydroxybutyrate co 14% 4-hydroxybutyrate (PHA9) having a glass transition temperature as measured by DSC of −10 C and polystyrene equivalent weight average molecular weight of 352,000 as measured by GPC were obtained by pressing the polymer between two PTFE sheets at 140 C for 5 seconds, followed by cooling at 15 C for 10 minutes The films had very slight finger tack initially but this disappeared over the next 15 minutes. The PHA films were stored at 25 C for a further 60 minutes prior to being laminated together under a pressure of 100 psi for 10 seconds. The film could not be separated. If the PHA laminated under a pressure of 20 psi for 5 seconds, the films could be separated.

Surface tack time value of PHA9 was 0.5 seconds.

EXAMPLE 17

Films of poly R-3-hydroxybutyrate co 14% 4-hydroxybutyrate (PHA10) having a glass transition temperature as measured by DSC of −10 C and polystyrene equivalent weight average molecular weight of 98,000 as measured by GPC were obtained by pressing the polymer between two PTFE sheets at 140 C for 5 seconds, followed by cooling at 15 C for 10 minutes The films had very slight finger tack initially but this disappeared over the next 15 minutes. The PHA films were stored at 25 C for a further 60 minutes prior to being laminated together under a pressure of 20 psi for 5 seconds. The film could not be separated.

Surface tack time value of PHA10 was 1 second.

EXAMPLE 18

A PHA polymer comprising 66.5% 3 R hydroxybutyrate and 33.5% 4 hydroxybutyrate of molecular weight (Mw) 110,000 was dissolved in butyl acetate to produce a solution with 13% w/w polymer content. The solution was applied to a untreated PET film using a knurled bar to provide a uniform 200 micron wet film. The solvent was removed by natural evaporation at 20-25 C. After 24 hours no solvent could be detected in the coated PET sample. The PHA film was tack free to touch. When two PHA coated PET films were brought gently into contact (contact pressure estimated at <1 psi) immediate adhesion between the PHA films was observed. Good autohesion was observed even after the film had been aged for 10 days.

EXAMPLE 19

As example 18 but the PHA comprising 70% 3 R hydroxybutyrate and 30% 4 hydroxybutyrate of molecular weight (Mw) 350,000 was dissolved in butyl acetate to produce a 10% solids content solution. Good autohesion between PHA films were observed after the film had been allowed to age for 24 hours at 20-25 C

EXAMPLE 20

As example 18 but the PHA comprising 78% 3 R hydroxybutyrate and 22% 4 hydroxybutyrate of molecular weight (Mw) 850,000 was dissolved in acetone to produce a 8% solids content solution. Autohesion was observed after allowing the film to dry for 60 minutes, however autohesion was lost when tested after 24 hours.

EXAMPLE 21

As example 18 but PET film replaced by Cellophane film supplied by UCB. Excellent autohesion was observed after the film had been aged at 20-25 C for 10 days.

EXAMPLE 22

A PHA polymer comprising 66.5% 3 R hydroxybutyrate and 33.5% 4 hydroxybutyrate of molecular weight (Mw) 110,000 was dissolved in butyl acetate to produce a solution with 13% w/w polymer content. The solution was applied to a plastic film using a knurled bar to provide a uniform 200 micron wet film. The solvent was removed by natural evaporation at 20-25 C.

Cold Seal Adhesion: lamination of the adhesive coated film to a piece of uncoated film using very light hand pressure (<2 psi). Immediately after lamination the strength of the adhesive bond was assessed. The results are summarized in Table 1.

TABLE 1

Summary of Cold Seal Adhesion Experiments.

| Coated substrate | Aging period of Coated substrate | Uncoated substrate | Strength of bond |
| --- | --- | --- | --- |
| Untreated PET | 24 hrs | Untreated PET | Very good |
| Untreated PET | 72 hrs | Cellophane | Very good |
| Untreated PET | 240 hrs | PLA | Very good |
| Untreated PET | 240 hrs | Coated paper | Good |
| Cellophane | 24 hrs | Untreated PET | Very good |
| Cellophane | 72 hrs | Cellophane | Very good |
| Cellophane | 240 hrs | PLA | Very good |

EXAMPLE 23

A PHA polymer comprising 66.5% 3 R hydroxybutyrate and 33.5% 4 hydroxybutyrate of molecular weight (Mw) 110,000 was dissolved in butyl acetate to produce a solution with 13% w/w polymer content. The solution was applied to a plastic film using a knurled bar to provide a uniform 200 micron wet film. The solvent was removed by natural evaporation at 20-25 C. Heat Seal Adhesion: lamination of the adhesive coated film to a piece of uncoated film using a domestic iron set on setting 2 (surface temperature 70-80 C) and light hand pressure (<5 psi). Immediately after lamination the strength of the adhesive bond was assessed. The results are summarized in Table 2.

TABLE 2

Summary of Hot Seal Adhesion Experiments.

| Coated substrate | Aging period of Coated substrate | Uncoated substrate | Strength of bond |
| --- | --- | --- | --- |
| Untreated PET | 24 hrs | Untreated PET | Cohesive failure |
| Untreated PET | 72 hrs | Cellophane | Cohesive failure |
| Untreated PET | 240 hrs | PLA | Cohesive failure |
| Untreated PET | 240 hrs | Coated paper | Paper surface failure |

TABLE 2-continued

Summary of Hot Seal Adhesion Experiments.

| Coated substrate | Aging period of Coated substrate | Uncoated substrate | Strength of bond |
|---|---|---|---|
| Untreated PET | 240 hrs | Aluminium foil | Good strength, adhesive failure |
| Cellophane | 24 hrs | Untreated PET | Cohesive failure |
| Cellophane | 72 hrs | Cellophane | Cohesive failure |
| Cellophane | 240 hrs | PLA | Cohesive failure |

EXAMPLE 24

A PHA polymer comprising 66.5% 3 R hydroxybutyrate and 33.5% 4 hydroxybutyrate of molecular weight (Mw) 10,000 was dissolved in butyl acetate to produce a solution with 13% w/w polymer content. The solution was applied to a crosslinked polysiloxane coated release paper using a knurled bar to provide a uniform 200 micron wet film. The solvent was removed by natural evaporation at 20-25 C. The dry film was laminated to a paper foil using a warm iron and the release paper removed to produce an adhesive coated paper substrate. The coated paper was then hot laminated to various substrates including untreated PET, Cellophane, PLA, aluminum foil, glass simulating a labeling process. In all case good adhesion was observed with cohesive failure after the bond had been allowed to mature for 15-30 minutes. Application of a warm iron to the paper surface of a disbanded sample resulted in re-adhesion between the two substrates with equivalent adhesion as with the original bond.

Other embodiments are in the claims.

What is claimed is:

1. A method comprising:
    applying a PHA solution comprising a solvent and a PHA to a substrate surface to form a layer of the PHA solution;
    removing at least some of the solvent to form a PHA adhesive composition on the substrate surface;
    wherein the PHA is a poly 3-hydroxybutyrate-co-4-hydroxybutyrate having a glass transition temperature from about −30° C. to about −5° C.; and the adhesive composition has an open time of at least 10 minutes; and the adhesive composition has a surface tack time value of at most about 15 seconds.

2. The method of claim 1, wherein the layer has a thickness of at most about 300 microns.

3. The method of claim 1, wherein the solvent is removed by evaporation.

4. The method of claim 1, wherein the solvent is removed at a temperature at most about 40° C.

5. The method of claim 1, further comprising contacting the substrate surface having the PHA adhesive composition thereon with a second substrate surface to form an adhesive bond with the second substrate surface.

6. The method of claim 5, wherein the second substrate surface is coated with the PHA adhesive composition before contacted with the substrate surface.

7. The method of claim 5, wherein the second substrate surface is not coated with the PHA adhesive composition before contacted with the substrate surface.

8. The method of claim 1, wherein the PHA has a glass transition temperature from about −25° C. to about −10° C.

9. An article comprising:
    a substrate having a surface; and
    an adhesive composition supported by the surface of the substrate, wherein the adhesive composition comprises a PHA, the PHA being poly 3-hydroxybutyrate-co-4-hydroxybutyrate having a glass transition temperature from about −30° C. to about −5° C.; and the adhesive composition has an open time of at least 10 minutes; and the adhesive composition has a surface tack time value of at most about 15 seconds.

10. The article of claim 9, wherein the adhesive composition forms a layer on the surface of the substrate.

11. The article of claim 10, wherein the layer has a thickness of at most about 300 microns.

12. The article of claim 9, further comprising a second substrate surface adhesively bonded to the surface of the article supporting the adhesive composition.

13. The article of claim 9, wherein the PHA has a glass transition temperature from about −25° C. to about −10° C.

14. The article of claim 9, wherein the adhesive composition comprises multiple different PHAs.

15. The article of claim 14, wherein the adhesive composition comprises two different PHAs.

16. The article of claim 9, wherein the adhesive composition further comprises one or more solvents.

17. The article of claim 16, wherein the adhesive composition comprises at most about 90 weight percent solvent.

18. The article of claim 16, wherein the adhesive composition comprises at most about 80 weight percent solvent.

19. The article of claim 16, wherein the adhesive composition comprises at most about 75 weight percent solvent.

20. The article of claim 16, wherein the adhesive composition comprises at most about 50 weight percent solvent.

21. The article of claim 16, wherein the adhesive composition comprises at most about 35 weight percent solvent.

22. The article of claim 16, wherein the adhesive composition comprises at most about 1 weight percent solvent.

23. The article of claim 16, wherein the adhesive composition comprises an organic solvent.

24. The article of claim 23, wherein the organic solvent is selected from the group consisting of hexane, heptane, benzene, toluene, ether, methyl tert-butyl ether, ethyl acetate, butyl acetate, methylene chloride, chloroform, acetonitrile, methanol, ethanol, isopropanol, and 2,2,2-trifluoroethanol.

25. The article of claim 16, wherein the adhesive composition comprises an aqueous solvent.

26. The article of claim 16, wherein the adhesive composition comprises two or more solvents.

27. The article of claim 9, wherein the adhesive composition further comprises one or more adhesive additives.

28. The article of claim 27, wherein the adhesive composition comprises at most about 95 weight percent adhesive additives.

29. The article of claim 27, wherein the adhesive composition comprises at most about 50 weight percent adhesive additives.

30. The article of claim 27, wherein the adhesive composition comprises at most about 10 weight percent adhesive additives.

31. The article of claim 27, wherein the adhesive composition comprises at most about 1 weight percent adhesive additives.

32. The article of claim 27, wherein the adhesive additives are selected from the group consisting of tackifiers, cross-linking agents, initiators, colorants, waxes, stabilizers and plasticizers.

33. The article of claim 9, wherein the adhesive composition has an open time of at least 100 minutes.

34. The article of claim 9, wherein the adhesive composition has an open time of at least 200 minutes.

35. The article of claim 9, wherein the adhesive composition has a surface tack time value of at most about 5 seconds.

36. The article of claim 9, wherein the adhesive composition has a surface tack time value of at most about 1 second.

* * * * *